(12) United States Patent
Halasa et al.

(10) Patent No.: US 7,825,195 B2
(45) Date of Patent: Nov. 2, 2010

(54) DENDRIMERS OF RUBBERY POLYMERS

(75) Inventors: Adel Farhan Halasa, Bath, OH (US); Wen-Liang Hsu, Cuyahoga Falls, OH (US); Chad Aaron Jasiunas, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/611,807

(22) Filed: Nov. 3, 2009

(65) Prior Publication Data

US 2010/0043938 A1 Feb. 25, 2010

Related U.S. Application Data

(62) Division of application No. 11/176,457, filed on Jul. 7, 2005, now Pat. No. 7,612,147.

(51) Int. Cl.
*C08C 19/25* (2006.01)
*C08F 8/18* (2006.01)
*C08F 36/04* (2006.01)
*C08J 3/24* (2006.01)
*B60C 1/00* (2006.01)

(52) U.S. Cl. .............. 525/331.9; 525/332.3; 525/332.5; 525/332.8; 525/332.9; 525/333.2; 525/342; 525/359.3; 525/383; 152/151; 152/450

(58) Field of Classification Search .............. 525/331.9, 525/332.3, 332.5, 332.8, 332.9, 333.2, 342, 525/359.3, 383; 152/151, 450
See application file for complete search history.

(56) References Cited

U.S. PATENT DOCUMENTS

| | | | |
|---|---|---|---|
| 3,244,664 A | 4/1966 | Zelinski et al. | 260/41.5 |
| 4,048,420 A | 9/1977 | Francois et al. | 526/173 |
| 4,618,650 A * | 10/1986 | Halasa et al. | 525/105 |
| 4,935,471 A | 6/1990 | Halasa et al. | 525/359.1 |
| 2004/0020576 A1 * | 2/2004 | Frank et al. | 152/450 |
| 2005/0049141 A1 | 3/2005 | Halasa et al. | 502/150 |

FOREIGN PATENT DOCUMENTS

| EP | 0 709 235 A | 1/1996 |
|---|---|---|
| WO | WO 95/13314 A | 5/1995 |
| WO | WO 02/16491 A | 2/2002 |

* cited by examiner

*Primary Examiner*—Roberto Rabago
(74) *Attorney, Agent, or Firm*—Alvin T. Rockhill

(57) ABSTRACT

This invention discloses a process for synthesizing a dendrimer of a rubbery polymer comprising: (a) reacting a lithium terminated rubbery polymer with a halogenated silicon containing compound to produce a polymer which is terminated with halogenated silicon moieties, wherein the halogenated silicon contain compound has at least four halogen atoms which are bonded directly to silicon atoms, wherein the ratio of the lithium terminated rubbery polymer to halogen atoms in the halogenated silicon containing compound is within the range of 2:n to (n-1):n, wherein n represents the number of halogen atoms that are bonded directly to silicon atoms in the halogenated silicon containing compound, wherein the halogenated silicon containing compound contains at least three halogen atoms which are bonded directly to a silicon atom; (b) reacting the polymer which is terminated with halogenated silicon moieties with a molar excess of a tertiary alcohol to produce a polymer which is terminated with hydroxy silyl moieties; and (c) allowing the polymer which is terminated with the hydroxy silyl moieties to couple under conditions sufficient to produce a dendrimer containing siloxane linkages. It has also be found that similar dendrimers having improved processability can be make utilizing halogenated tin containing compounds in stead of the halogenated silicon containing compound.

15 Claims, No Drawings

DENDRIMERS OF RUBBERY POLYMERS

This is a divisional of U.S. patent application Ser. No. 11/176,457, filed on Jul. 7, 2005 (now issued as U.S. Pat. No. 7,612,147). The teachings of U.S. Pat. No. 7,612,147 are incorporated by reference herein in their entirety.

BACKGROUND OF THE INVENTION

Metals from Groups I and II of the periodic table are commonly used to initiate the polymerization of monomers into polymers. For example, lithium, barium, magnesium, sodium, and potassium are metals that are frequently utilized in such polymerizations. Initiator systems of this type are of commercial importance because they can be used to produce stereo regulated polymers. For instance, lithium initiators can be utilized to initiate the anionic polymerization of isoprene into synthetic polyisoprene rubber or to initiate the polymerization of 1,3-butadiene into polybutadiene rubber having a derived microstructure.

The polymers formed in such polymerizations are terminated with the metal used to initiate the polymerization and are sometimes referred to as living polymers. They are referred to as living polymers because the polymer chains which are terminated with the metal initiator continue to grow or live until all of the available monomer is exhausted and/or until the polymerization is terminated by the addition of an agent that "kills" the living polymer chain ends, such as an alcohol. Polymers that are prepared by utilizing such metal initiators normally have structures which are essentially linear and normally do not contain appreciable amounts of branching.

Such rubbery polymers that do not contain appreciable amounts of branching have certain drawbacks in that their flow characteristics at room temperature are extremely high and in that their tensile strength and tear resistance in the unvulcanized state are very poor due to less chain entanglement among their molecular chains. Due to these characteristics, the processing of such rubbery polymers prior to vulcanization is sometimes difficult. In order to improve the cold flow characteristics, tensile strength, and tear resistance of such unvulcanized rubbers they are often crosslinked prior to processing and subsequent vulcanization. Such metal terminated rubbery polymers can be crosslinked by treatment with compounds that contain two or more vinyl groups, such as divinylbenzene.

Living rubbery polymers can also be end-linked with tin halides or silicon halides. For instance, it is common in the art to couple living rubbery polymers with a stoichiometric amount of tin tetrachloride or silicon tetrachloride. The coupling of a lithium terminated polymer with silicon tetrachloride is illustrated in the following reaction scheme:

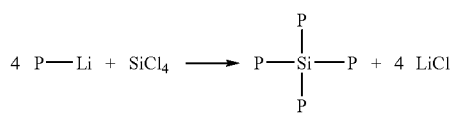

wherein P represents polymer chains. As can be seen one mole of silicon tetrachloride is required for every four moles of lithium terminated polymer chains. In other words, one mole of silicon tetrachloride is required for every four moles of lithium in the lithium terminated polymer being treated. This relationship must be stoichiometrically perfect in order to endlink every lithium terminated polymer chain in the polymer being treated. This is because if too much (more than a stoichiometric amount) of silicon tetrachloride is utilized the polymer chains can react with the silicon tetrchloride to become terminated with a chlorinated silicon moiety without being coupled to another polymer chain. Such unbranched polymer chains have the structural formula:

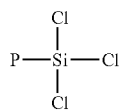

wherein P represents polymer chains. Such silicon trichloride terminated polymer chains will not react with each other to facilitate coupling.

Due to the fact that the amount of silicon trichloride needed to endlink a metal terminated polymer must be stoichiometrically perfect in order to maximize the endlinking of such polymers, it is virtually impossible to endlink 100 percent of the metal terminated polymer chains in a polymer by utilizing silicon tetrachloride as the crosslinking agent. Another drawback associated with utilizing silicon halides as crosslinking agents is that a maximum of four polymer chains can be endlinked together in each polymer network formed.

U.S. Pat. No. 4,618,650 offers a process for endlinking metal terminated polymers wherein a molar excess of the crosslinking agent can be utilized without maintaining a perfect stoichiometric relationship in order to attain maximum crosslinking. The utilization of this technique can also result in the formation of huge polymeric networks which can theoretically contain an infinite number of polymer chains.

U.S. Pat. No. 4,618,650 discloses a process for endlinking a metal terminated polymer comprising: (a) reacting the metal terminated polymer with a molar excess of a halogenated silicon containing compound, wherein the halogenated silicon containing compound contains at least two halogen atoms which are bonded directly to a silicon atom, to produce a polymer which is terminated with halogenated silicon moieties wherein the halogenated silicon moieties contain at least one halogen atom which is bonded directly to a silicon atom; (b) reacting the polymer which is terminated with halogenated silicon moieties with a molar excess of a tertiary alcohol to produce a polymer which is terminated with hydroxy silyl moieties; and (c) allowing the polymer which is terminated with the hydroxy silyl moieties to endlink under conditions sufficient to produce a network polymer containing siloxane linkages.

U.S. Pat. No. 4,618,650 more specifically discloses a process for endlinking a metal terminated polymer comprising: (a) reacting the metal terminated polymer with a molar excess of a halogenated silicon containing compound having the structural formula

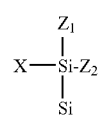

wherein X represents a halogen and wherein $Z_1$ and $Z_2$ can be the same or different and are selected from the group consisting of halogens and alkyl groups, to produce a polymer which is terminated with halogenated silicon moieties, wherein the halogenated silicon moieties have the structural formula

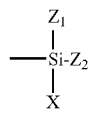

wherein X represents a halogen and wherein $Z_1$ and $Z_2$ can be the same or different and are selected from the group consisting of halogens and alkyl groups; (b) reacting the polymer which is terminated with halogenated silicon moieties with a molar excess of a tertiary alcohol to produce a polymer which is terminated with hydroxy silyl moieties, wherein the hydroxy silyl moieties have the structural formula

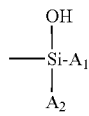

wherein $A_1$ and $A_2$ can be the same or different and are selected from the group consisting of alkyl groups and hydroxyl groups; and (c) allowing the polymer which is terminated with the hydroxy silyl moieties to endlink under conditions sufficient to produce a network polymer containing siloxane linkages.

The network polymers formed by the process of U.S. Pat. No. 4,618,650 are usually the reaction product of one or more polymers which are comprised of polymer chains which are terminated with at least one moiety which has a structural formula selected from the group consisting of

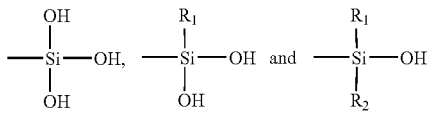

wherein $R_1$ and $R_2$ are alkyl moieties which can be the same or different. The network polymers made by the process of U.S. Pat. No. 4,618,650 are essentially in the form of stars with the polymer chains being coupled together at a point near the center of the star.

SUMMARY OF THE INVENTION

The subject invention provides a very efficient technique for making dendrimers from living rubbery polymers. In making the dendrimer less than a stoichiometric amount of a silicon halide coupling agent or a tin halide coupling agent is utilized. The dendrimers made by the process of this invention can be made to virtually any desired molecular weight by controlling the average number polymer chains that are bound together to form the dendrimer.

The purpose of this invention is to provide high molecular weight elastomers with multifunctional species for better process while maintaining a high molecular weight fraction for better hysteresis and tread-wear characteristics when used in tire tread applications. Additionally, some of the polymer chains contain alkoxy groups for better polymer/filler interaction with carbon black and silica fillers. Dendrimers made with tin halide coupling agents provide improved processing characteristics.

The present invention specifically discloses a process for synthesizing a dendrimer of a rubbery polymer comprising: (a) reacting a lithium terminated rubbery polymer with a halogenated silicon containing compound to produce a polymer which is terminated with halogenated silicon moieties, wherein the halogenated silicon contain compound has at least four halogen atoms which are bonded directly to silicon atoms, wherein the molar ratio of the lithium terminated rubbery polymer to halogen atoms in the halogenated silicon containing compound is within the range of 2:n to (n-1):n, wherein n represents the number of halogen atoms that are bonded directly to silicon atoms in the halogenated silicon containing compound, wherein the halogenated silicon containing compound contains at least three halogen atoms which are bonded directly to a silicon atom; (b) reacting the polymer which is terminated with halogenated silicon moieties with a molar excess of a tertiary alcohol to produce a polymer which is terminated with hydroxy silyl moieties; and (c) allowing the polymer which is terminated with the hydroxy silyl moieties to couple under conditions sufficient to produce a dendrimer containing siloxane linkages.

The subject invention also reveals a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is a cured the rubber formulation which is comprised of (1) a dendrimer of a rubbery polymer make by (a) reacting a lithium terminated rubbery polymer with a halogenated silicon containing compound to produce a polymer which is terminated with halogenated silicon moieties, wherein the halogenated silicon contain compound has at least four halogen atoms which are bonded directly to silicon atoms, wherein the molar ratio of the lithium terminated rubbery polymer to halogen atoms in the halogenated silicon containing compound is within the range of 2:n to (n-1):n, wherein n represents the number of halogen atoms that are bonded directly to silicon atoms in the halogenated silicon containing compound, wherein the halogenated silicon containing compound contains at least three halogen atoms which are bonded directly to a silicon atom; (b) reacting the polymer which is terminated with halogenated silicon moieties with a molar excess of a tertiary alcohol to produce a polymer which is terminated with hydroxy silyl moieties; and (c) allowing the polymer which is terminated with the hydroxy silyl moieties to couple under conditions sufficient to produce the dendrimer; and (2) a filler selected from the group consisting of carbon black and silica.

The present invention further discloses a process for synthesizing a dendrimer of a rubbery polymer comprising: (a) reacting a lithium terminated rubbery polymer with a halogenated tin containing compound to produce a polymer which is terminated with halogenated tin moieties, wherein the molar ratio of the lithium terminated rubbery polymer to halogen atoms in the halogenated tin containing compound is within the range of 2:n to (n-1):n, wherein n represents the number of halogen atoms that are bonded directly to tin atoms in the halogenated tin containing compound, wherein the halogenated tin containing compound contains at least three halogen atoms which are bonded directly to tin atoms; (b) reacting the polymer which is terminated with halogenated tin moieties with a molar excess of a tertiary alcohol to produce a polymer which is terminated with hydroxy tin moieties; and (c) allowing the polymer which is terminated with the hydroxy tin moieties to couple under conditions sufficient to produce a dendrimer of the rubbery polymer.

DETAILED DESCRIPTION OF THE INVENTION

The process of the present invention can be used to make a dendrimer of virtually any living rubbery polymer which is terminated with a metal of group I or II of the periodic table. These polymers can be produced utilizing techniques that are well known to persons skilled in the art. The initiator used in the polymerization utilized in producing such polymers is most commonly selected from the group consisting of barium, lithium, magnesium, sodium, and potassium. Lithium and magnesium are the metals that are most commonly utilized in the synthesis of such metal terminated polymers (living polymers) with lithium being used in most commercial applications.

The initiator will normally be monofunctional initiators having the general structural formula P-M, wherein P represents a polymer chain and wherein M represents a metal of group I or II. The metal initiators utilized in the synthesis of such metal terminated polymers can also be multifunctional organometallic compounds. For instance, difunctional organometallic compounds can be utilized to initiate such polymerizations. The utilization of such difunctional organometallic compounds as initiators generally results in the formation of polymers having the general structural formula M-P-M, wherein P represents a polymer chain and wherein M represents a metal of group I or II. Such polymers which are terminated at both of their chain ends with a metal from group I or II also can be reacted with nitrones to functionalize both of their chain ends. It is believed that utilizing difunctional initiators will couple both ends of the polymer chain in the formation of the dendrimer.

Organolithium compounds are the preferred initiators for utilization in such polymerizations. The organolithium compounds which are utilized as initiators are normally organo monolithium compounds. The organolithium compounds which are preferred as initiators are monofunctional compounds which can be represented by the formula: R—Li, wherein R represents a hydrocarbyl radical containing from 1 to about 20 carbon atoms. Generally, such monofunctional organolithium compounds will contain from 1 to about 10 carbon atoms. Some representative examples of preferred lithium initiators include butyllithium, secbutyllithium, n-hexyllithium, n-octyllithium, tertoctyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium. Secondary-butyllithium is a highly preferred organolithium initiator.

Very finely divided lithium having an average particle diameter of less than 2 microns can also be employed as the initiator for the synthesis of living rubbery polymers that can be functionalized with nitrones in accordance with this invention. U.S. Pat. No. 4,048,420, which is incorporated herein by reference in its entirety, describes the synthesis of lithium terminated living polymers utilizing finely divided lithium as the initiator. Lithium amides can also be used as the initiator in the synthesis of living polydiene rubbers (see U.S. Pat. No. 4,935,471 the teachings of which are incorporated herein by reference with respect to lithium amides that can be used as initiators in the synthesis of living rubbery polymer).

The amount of organolithium initiator utilized will vary depending upon the molecular weight which is desired for the rubbery polymer being synthesized as well as the precise polymerization temperature which will be employed. The precise amount of organolithium compound required to produce a polymer of a desired molecular weight can be easily ascertained by persons skilled in the art. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator. The metal terminated polymers to which the present invention pertains have the general structural formula P-M, wherein P represents a polymer chain and wherein M represents a metal of group I or II. The metal catalysts utilized in the synthesis of such metal terminated polymers are very commonly in the form of organometallic compounds. For instance, lithium is commonly utilized to catalyze such polymerizations in the form of an organolithium compound. Such organolithium compounds generally have the structural formula LiR, wherein R represents an alkyl group containing from 1 to 20 carbon atoms. More commonly, the alkyl group in such alkyl lithium compounds will contain from 2 to 8 carbon atoms. For instance, butyl lithium is very commonly utilized as a catalyst in such polymerizations.

Many types of unsaturated monomers which contain carbon-carbon double bonds can be polymerized into rubbery polymers using such metal catalysts. Elastomeric or rubbery polymers can be synthesized by polymerizing diene monomers utilizing this type of metal catalyst system. The diene monomers that can be polymerized into synthetic rubbery polymers can be either conjugated or nonconjugated dienes. Vinyl-substituted aromatic monomers can also be copolymerized with one or more diene monomer into rubbery polymers, for example styrene-butadiene rubber (SBR). Some representative examples of conjugated diene monomers that can be polymerized into rubbery polymers include 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene. Some representative examples of vinyl-substituted aromatic monomers that can be utilized in the synthesis of rubbery polymers include styrene, 1-vinylnapthalene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, 3-ethyl-1-vinylnapthalene, 6-isopropyl-1-vinylnapthalene, 6-cyclohexyl-1-vinylnapthalene, 7-dodecyl-2-vinylnapthalene, .alpha.-methylstyrene, and the like.

The metal terminated polymers used in making dendrimers in accordance with this invention are generally prepared by solution polymerizations which utilize a saturated aliphatic hydrocarbon or an aromatic hydrocarbon as the solvent. Such polymerizations result in the formation of a polymer cement (a highly viscous solution of the living polymer). The process of this invention can be utilized to couple the living polymer chains of such rubbery polymers into dendrimers while they are still in the polymer cement. In fact, it is preferable to couple such metal terminated polymers into dendrimers while they are still in solution. However, metal terminated rubbery polymers can also be coupled into dendrimers utilizing the process of the present invention in bulk (as dry polymers). For example, dry metal terminated polymers can be crosslinked into a dendrimer in a Banbury mixer utilizing the process of the present invention. Metal terminated polymers which have previously been crosslinked with agents containing multiple vinyl groups, such as divinylbenzene, can also be coupled into dendrimers in accordance with the process of this invention.

Metal terminated polymers can be coupled into dendrimers utilizing the process of the present invention by first treating the metal terminated polymer with a halogenated silicon containing compound, such as silicon tetrachloride or silicon tetrabromide, dodecachloropentasiloxane ($Cl_{12}Si_5O_4$), decachlorotetrasiloxane ($Cl_{10}Si_4O_3$), hexachlorodisiloxane ($Cl_6Si_2O$) and hexachlorodisilazane ($Cl_6Si_2$).

These halogenated silicon containing compounds contain at least 3 halogen atoms which are bonded directly to one or more silicon atoms. Such halogenated silicon containing compounds generally have a structural formula selected from the group consisting of

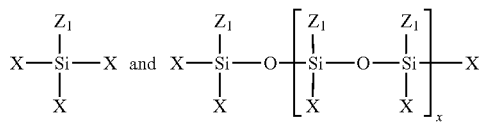

wherein X represents a halogen atom, wherein $Z_1$ groups can be the same or different and are selected from the group consisting of halogen atoms and alkyl groups and wherein x represents an integer from 1 to 20. The alkyl groups in such halogenated silicon containing compounds normally contain from 1 to 8 carbon atoms. Most preferably $Z_1$ will represent a halogen atom. Chlorine and bromine are preferred halogen atoms with chlorine being the most preferred.

In the alternative the metal terminated polymer can be coupled into a dendrimer utilizing a halogenated tin containing compound in place of the halogenated silicon containing compound. Such halogenated tin containing compounds generally have a structural formula selected from the group consisting of

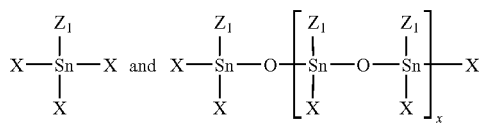

wherein X represents a halogen atom, wherein $Z_1$ groups can be the same or different and are selected from the group consisting of halogen atoms and alkyl groups and wherein x represents an integer from 1 to 20. The alkyl groups in such halogenated tin containing compounds normally contain from 1 to 8 carbon atoms. Most preferably $Z_1$ will represent a halogen atom. As was the case with the halogenated silicon containing compounds, chlorine and bromine are preferred halogen atoms with chlorine being the most preferred.

This treating process can be done by simply mixing the halogenated silicon containing compound or the halogenated tin containing compound into a solution containing the metal terminated polymer being treated. In other words, the halogenated silicon containing compound or halogenated tin containing compound utilized can be mixed into a polymer cement containing the metal terminated polymer. This step in the process of this invention can also be done by mixing the halogenated silicon or tin containing compound into a dry metal terminated polymer. For example, the halogenated silicon or tin containing compound could be distributed throughout a dry metal terminated polymer in a mill mixer or in a Banbury mixer.

The halogenated silicon compound or halogenated tin containing compound will be employed in an amount that results in the molar ratio of the lithium terminated rubbery polymer to halogen atoms in the halogenated silicon containing compound or halogenated tin containing compound being within the range of 2:n to (n-1):n, wherein n represents the number of halogen atoms that are bonded directly to silicon atoms or tin atoms in the halogenated silicon containing compound. The molar ratio of the lithium terminated rubbery polymer to halogen atoms in the halogenated silicon containing compound or halogenated tin containing compound is preferably be within the range of 3:n to (n-1):n, wherein n represents the number of halogen atoms that are bonded directly to silicon atoms or tin atoms in the halogenated silicon containing compound or the halogenated tin containing compound. For instance, in the case of silicon tetrachloride the molar ratio of living metal end-groups in the polymer to the silicon tetrachloride would be within the range of 1:2 to 3:4 and would preferably be 3:4.

The temperature at which this step of the process is carried out is not particularly critical. However, it will generally be carried out at a temperature of 0° C. to about 150° C. Most commonly this step of the process will be done at ambient temperature. During this step of the process the halogenated silicon containing compound or halogenated tin containing compound reacts with the metal terminated polymer so as to produce a polymer which is terminated with halogenated silicon moieties or halogenated tin moieties wherein the halogenated silicon or tin moieties contain at least one halogen atom which is bonded directly to a silicon atoms or a tin atoms.

In the second step of the process of the present invention, the rubbery polymer which is terminated with halogenated silicon or tin moieties (which was produced in the first step) is reacted with a molar excess of a tertiary alcohol to produce a polymer which is terminated with hydroxy silyl moieties or hydroxyl tin moieties. These hydroxy silyl moieties or hydroxyl tin moieties contain at least one hydroxy group which is bonded directly to a silicon atom or a tin atom. For example, such hydroxy silyl moieties can have the structural formula:

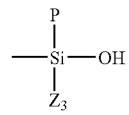

wherein P represents the chain of a rubbery polymer, and wherein $Z_3$ represents an alkyl groups, a hydroxyl group, or the chain of a rubbery polymer. The temperature at which this step of the process is carried out is again not very critical. However, it will normally be convenient to conduct this step of the process at a temperature between 0° C. and 150° C. Normally this step in the process will be conducted at ambient temperature. The tertiary alcohols that can be used will normally contain from 4 to 20 carbon atoms and the tertiary alcohols that are preferred contain from 4 to 8 carbon atoms.

In the final step of the process of this invention the hydroxy silyl or hydroxyl tin terminated polymer formed in the second step is allowed to couple into dendrimers at a temperature between about 10° C. and 150° C. This step of the process can be carried out without utilizing any catalyst at a temperature of 80° C to 150° C. It will preferably be conducted at a temperature of 110° C. to 140° C. and will most preferably be conducted at a temperature of 125° C. to 135° C. This step in the process can be carried out at lower temperatures if a catalyst is utilized. It is believed that organic diamines having the structural formula

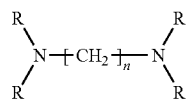

wherein R is an alkyl group containing from 1 to 3 carbon atoms and wherein n is an integer from 1 to 4 inclusive can be utilized as such a catalyst. Some representative examples of some suitable catalysts of this type include: N,N,N',N'-tetramethylmethanediamine, N,N-dimethyl-N'N'-diethyl-1,2-ethanediamine, N,N,N',N'-tetramethyl-1,2-ethanediamine, N,N,N',N'-tetraethyl-1,2-ethanediamine, N,N,N',N'-tetramethyl-1,3-propanediamine, and N,N,N',N'-tetramethyl-1,4-butanediamine. A particularly preferred catalyst is N,N,N',N'-tetramethyl-1,2-ethanediamine.

After the coupling reaction is completed to form the dendrimer, it will normally be desirable to "kill" any living polydiene chains which remain. This can be accomplished by adding an alcohol, such as methanol or ethanol, to the polymer cement after the functionalization reaction is completed in order to eliminate any living polymer that was not consumed in producing the dendrimer. The dendrimer of the rubbery polymer can then be recovered from the solution utilizing standard techniques.

The dendrimers of this invention are of particular value in making tire tread compounds and in manufacturing tires which are normally comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting. However, they are also of value for use in manufacturing other products where good interaction with fillers is desirable, such as applications where low hysteresis is an advantage. For instance, dendrimer rubbers made by utilizing the technique of this invention can also be beneficial employed in manufacturing power transmission belts. In any case, the dendrimers of this invention can be blended with a wide variety of additional ingredients to attain the desired combination of physical attributes. For instance, it may be desirable to blend one or more resins, such as, coumarone-indene resin into the composition in cases where tire treads for high performance tires are being manufactured. The resin will normally be added in an amount that is within the range of about 5 phr to about 60 phr in race tire applications. In passenger tires that are designed for high speed applications, the resin will typically be added in an amount that is within the range of 2 phr to about 20 phr. In general purpose passenger tire applications, it is typically preferred for the tread compound to contain only a small amount (1 phr to 5 phr) of a resin or for the tread formulation to not contain any resin at all.

The dendrimers of this invention can be compounded utilizing conventional ingredients and standard techniques. For instance, the rubber compound will typically also include sulfur, accelerators, waxes, scorch inhibiting agents and processing aids. In most cases, the tread rubber formulation will be compounded with sulfur and/or a sulfur containing compound, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Tire tread rubber formulations made with the functionalized rubbers of this invention will also normally contain from 0.5 to 10 phr of zinc oxide with 1 to 5 phr being preferred. These blends can optionally contain from 0 to 30 phr of tackifier resins, 0 to 10 phr of reinforcing resins, 1 to 10 phr of fatty acids, 0 to 2.5 phr of peptizers and 0 to 1 phr of scorch inhibiting agents.

The tire tread rubber formulations of this invention can be used in tire treads in conjunction with ordinary tire manufacturing techniques. Tires are built utilizing standard procedures with the tread compound of this invention simply being substituted for the rubber compounds typically used as the tread rubber. After the tire has been built with the tread formulations of this invention, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE IA

In a one gallon (3.8 liter) reactor equipped with an air driven stirrer, a nitrogen inlet, and a water cooling coil (inside the reactor) was charged with 2000.0 grams of a 20% monomer mixture of 1,3-butadiene and styrene at a styrene to butadiene ratio of 20:80. Then, 80 mmoles of secondary butyllithium and 160 mmoles of tetramethylethylenediamine (TMEDA) were charged into the reactor (targeting a number average molecular weight (Mn) of 5,000. The polymerization temperature was adjusted to 75° C. and after the reaction was completed, the chain ends were still active (living). Then, 400 mmoles of lithium tert-butoxide in hexane solution was added to react with the live ends of the polymer. The contents of the reactor were stirred for five to ten minutes. After that, 80 mmoles of the coupling agent hexachlorodisiloxane was added and the reaction was stirred for an additional ten minutes. The molar ratio of reactants utilized was 1/5/2/1. After the reaction was completed the polymer was isolated and stabilized with an antioxidant and the samples were analyzed by GPC. The GPC analysis showed three main peaks. Fraction 1 (40%) was the base polymer having a Mn of 6,590: Fraction 2 had a functionality of six, a Mn of 42,000 and represented 24%. Fraction 3 represented 37%, had a functionality of 31 and had a Mn of 208,300.

EXAMPLE IB

The same procedure was repeated as in Example IA with the following modifications. In this manner the lithium tert-butoxide was added initially with the butyllithium catalyst and the polymerization was conducted at 75° C. for a target molecular weight of 100,000. The coupling agent was added after the polymerization was completed. The GPC data shows that 46% of the polymer had Mn of 2,070,000 and a functionality of 20.70.

EXAMPLE IIA

The same procedures were repeated as in Example I except the starting number average molecular weight was 1,000. The coupling was employed using the same ratios as in Example I. The isolated polymer was analyzed by GPC and the following results were obtained. The base polymer was a 41% fraction having a Mn of 10,000, fraction 2 represented 12% had a functionality of 2.24, and had a Mn of 22,490, and the third fraction represented 6.93% and had a Mn of 69,360.

EXAMPLE IIB

The same procedure was followed as in Example IB except that the targeted molecular weight was 150,000 and the polymerization was allowed to run for a much longer time (four days). The coupling agent was hexachlorodisiloxane with the addition of lithium tert-butoxide. The coupled polymers had a Mooney ML4 viscosity of 70.16. The GPC shows peaks at 962,900 and a functionality of 6.4

EXAMPLE III

The same procedure as in Example I was repeated except the molecular weight of the target polymer was 20,000. The same ratios of coupling agent were used in this example. The polymer was isolated and characterized by GPC. The base polymer having a Mn of 20,590 represented a 53% fraction. A second fraction representing 14% was determined to have a Mn of 44,400 and a functionality of 2 and a third fraction representing 33.3% had a functionality of 6.89 and a Mn of 137,800.

EXAMPLE IV

The same procedure was followed as in Example I except the target molecular weight was 200,000. The polymer was isolated and characterized by GPC. The GPC data showed a 83% fraction which represented the base polymer which had a Mn of 193,900 a second fraction having a 2.5 functionality and a Mn of 475,200, and a third fraction of 4 functionality representing 8% having a Mn of 790,000.

It is interesting to note that the lithium tert-butoxide showed a dramatic effect on the 5,000 molecular weight polymer with less sustention effect on the 200,000 molecular weight polymer. In this manner one can choose a tread rubber based on its performance characteristics to maximize the beneficial utilization of the dendrimers of this invention. For example, for traction treads one may want to choose the 10,000 initial base polymer for making the dendrimer via the coupling technique of this invention.

EXAMPLE V

The same procedure was used as in Example I for making an SBR with a 12% styrene and 88% butadiene with the target molecular weight being 50,000. The coupling agent that was used in this example was silicon tetrachloride at a molar ratio to lithium of 1:3. The lithium tert-butoxide was added after the polymerization was completed and before the silicon tetrachloride was added. The GPC indicates that 56% of the polymer had a functionality of 4.25 and 44% of the polymer chains had a functionality of one with the butoxide group on the end.

EXAMPLE VI

The same procedure was used as in Example I except the coupling with cyclic chlorosilixane such as dodecachloropentasiloxane($Cl_{12}Si_5O_4$) and dodecachlrotetrasiloxane ($Cl_{10}Si_4O_3$). In a one gallon (3.8 liter) reactor equipped with an air driven stirrer, a nitrogen inlet, and a water cooling coil (inside the reactor) was charged with 2000 grams of premix of hexane containing 25% styrene monomer and 75% butadiene. Polymerization was initiated in this premix by the addition of 1.25 mmoles of secondary butyllithium and 4.0 mmoles of TMEDA. The reactor mixture was heated to 75° C. and the monomers were allowed to polymerize. Coupling was then effectuated by addition of the coupling agent identified in Table I. The specifics regarding the dendrimers made in this series of experiments is also shown in Table I.

TABLE I

| Run # | Polymer Composition | Catalyst Composition | Coupling Agent | Base Molecular Weight | Coupled Mooney | Coupled Molecular Weight (Mw) | # of Arms |
|---|---|---|---|---|---|---|---|
| A | PBD | Sec-BuLi/TMEDA | $Cl_6Si_2O$ | 6,593 | — | 371,000 | 53 |
| B | PBD | Sec-BuLi/TMEDA | $Cl_6Si_2O$ | 6,593 | — | 50,960 | 7.28 |
| C | PBD | Sec-BuLi/TMEDA | $Cl_6Si_2O$ | 20,500 | — | 1,378,000 | 76.2 |
| D | PBD | Sec-BuLi/TMEDA | $Cl_6Si_2O$ | 20,500 | — | 44,400 | 2.2 |
| E | SBR (30/70) | Sec-BuLi/TMEDA | $Cl_6Si_2O$ | 10,000 | — | 2,583,600 | 25.83 |
| F | SBR (30/70) | Sec-BuLi/TMEDA | $Cl_6Si_2O$ | 10,000 | — | 194,300 | 1.94 |
| G | SBR (30/70) | Sec-BuLi/TMEDA | $Cl_6Si_2O$ | 10,000 | — | 2,597,000 | 20.7 |
| H | SBR (30/70) | Sec-BuLi/TMEDA | $Cl_6Si_2O$ | — | — | 322,500 | 3.25 |
| I | 12/88 (SBR) | n-BuLi/TMEDA | $Cl_6Si_2O$ | 250,000 | 145 | 2,097,000 | 8.38 |
| J | 12/88 (SBR) | n-BuLi/TMEDA | $Cl_6Si_2O$ | 250,000 | 145 | 450,000 | 2.0 |
| K | SBR 12/88 | nBuLi/TMEDA/ROLi | $Cl_6Si_2O$ | 150,000 | — | 2,700,000 | 18.0 |
| L | SBR 12/88 | nBuLi/TMEDA/ROLi | $Cl_6Si_2O$ | 150 | — | 460,000 | 3.0 |
| M | SBR 12/88 | nBuLi/TMEDA/ROLi | $Cl_6Si_2O$ | 150 | — | 289,000 | 1.93 |
| N | SBR 12/88 | nBuLi/TMEDA/ROLi | $Cl_6Si_2O$ | 150 | — | 2,600,000 | 17.3 |
| O | SBR 12/88 | nBuLi/TMEDA/ROLi | $Cl_6Si_2O$ | 150 | — | 290,000 | 1.93 |
| P | SBR 12/88 | nBuLi/TMEDA/ROLi | $Cl_6Si_2O$ | 175,000 | — | 2,020,000 | 11.56 |
| Q | SBR 12/88 | nBuLi/TMEDA/ROLi | $Cl_6Si_2O$ | 175,000 | — | 219,000 | 1.25 |
| R | PBD | nBuLi/$(RN_3)_3$SiNLi | $Cl_6Si_2O$ | 10,000 | — | 650,000 | 65 |

TABLE I-continued

| Run # | Polymer Composition | Catalyst Composition | Coupling Agent | Base Molecular Weight | Coupled Mooney | Coupled Molecular Weight (Mw) | # of Arms |
|---|---|---|---|---|---|---|---|
| S | PBD | nBuLi/(RN$_3$)$_3$SiNLi | C$_16$Si$_2$O | 10,000 | — | 65,400 | 6.4 |
| T | PBD | nBuLi/(RN$_3$)$_3$SiNLi | C$_16$Si$_2$O | 10,000 | — | 29,900 | 2.99 |
| U | SBR 12/88 | nBuLi/(RN$_3$)$_3$SiNLi | C$_16$Si$_2$O | 125,000 | 77 | 3,300,000 | 26.4 |
| V | SBR 12/88 | nBuLi/(RN$_3$)$_3$SiNLi | C$_16$Si$_2$O | 125,000 | 77 | 19,400 | 1.55 |
| W | SBR 12/88 | nBuLi/(RN$_3$)$_3$SiNLi | C$_16$Si$_2$O | 125,000 | 114 | 2,438,000 | 19.5 |
| X | SBR 12/88 | nBuLi/(RN$_3$)$_3$SiNLi | C$_16$Si$_2$O | 250,000 | 145 | 2,090,000 | 16.72 |
| Y | SBR 12/88 | nBuLi/(RN$_3$)$_3$SiNLi | C$_16$Si$_2$O | 150,000 | — | 2,400,000 | 16.0 |
| Z | SBR 12/88 | nBuLi/(RN$_3$)$_3$SiNLi | C$_16$Si$_2$O | 150,000 | 63.3 | 750,000 | 5.0 |
| AA | SBR 12/88 | nBuLi/(RN$_3$)$_3$SiNLi | C$_16$Si$_2$O | 150,000 | 62.82 | 1,200,000 | 8.2 |
| AB | SBR 12/88 | nBuLi/(RN$_3$)$_3$SiNLi | SiCl$_4$ | 50,000 | — | 363,000 | 7.6 |

The data in Table I indicates that the coupling has taken place as shown by the GPC. This suggests that the cyclic siloxane compounds are very useful in increasing the molecular weight of the base polymers.

EXAMPLE VII

The same procedure was followed as in Example I except the SBR had a bound styrene to butadiene ratio of 10/90 and the target molecular weight was 100,000 and the butyllithium to TMEDA ratio used was 1/2. The coupling agent was silicon tetrachloride. The Mooney M1-4 viscosity of the base polymer was 10 while the Mooney M1-4 of the coupled polymer was 73. The polymer has three peaks in the GPC. Peak I had a Mn of 7,950 and functionality of 8.7 (26%). Peak II had a Mn of 2,720 and a functionality of 2 and the residual precursor had a Mn of 97,000 and functionality of one with the butoxide attached to the polymer chain.

EXAMPLE VIII

The same procedure was followed as in Example I for making a SBR having a bound styrene to butadiene ratio of 12/88 and having a Mn of 100,000. The ratio of n-butyllithium to TMEDA was 1:2. The polymer had a glass transition temperature (Tg) of −38.7° C. The living chain ends were reacted with lithium phenolate and the coupled with silicon tetrachloride at a ratio of 1:3 to the living lithium chains. The GPC showed the polymer as having three peaks. Peak I had a Mn of 848,900 (23%) and a functionality of 8, and peak II had a Mn of 283,000 and functionality of 3. Peak III the precursor had a Mn of 95,000 with a phenolate chain end.

EXAMPLE IX

In a one gallon (3.8 liter) reactor equipped with an air driven stirrer, a nitrogen inlet, and a water cooling coil (inside the reactor) was charged with 2000.0 grams of a 20% monomer mixture of 1,3-butadiene and styrene at a styrene to butadiene ratio of 20:80. Polymerization was then initiated with butyllithium. The polymerization was modified with TMEDA to make a polymer having a targeted Mn of 75,000. The polymer was coupled with hexachlorostannic oxide. The polymer was collected and the GPC was run on the samples. The GPC showed many peaks. One peak represented a Mn of 75,000 and a functionality of 1. Another peak represented a Mn of 299,000 and a functionality of 3.98. A third peak represented a Mn of 474,000 and a functionality of 6.30 and a fourth peak represented a Mn of 1,200,000 and a functionality of 16.0.

While certain representative embodiments and details have been shown for the purpose of illustrating the subject invention, it will be apparent to those skilled in this art that various changes and modifications can be made therein without departing from the scope of the subject invention.

What is claimed is:

1. A dendrimer of a rubbery polymer made by a process comprising: (a) reacting a lithium terminated rubbery polymer with a halogenated silicon containing compound to produce a polymer which is terminated with halogenated silicon moieties, wherein the halogenated silicon containing compound is of the structural formula:

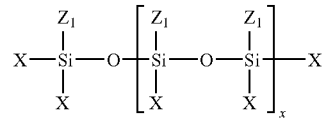

wherein X represents a halogen atom selected from the group consisting of chlorine and bromine, wherein Z$_1$ groups can be the same or different and are selected from alkyl groups that contain from 1 to 8 carbon atoms and wherein x represents an integer from 1 to 20, wherein the molar ratio of the lithium terminated rubbery polymer to halogen atoms in the halogenated silicon containing compound is within the range of 2:n to (n-1):n, wherein n represents the number of halogen atoms that are bonded directly to silicon atoms in the halogenated silicon containing compound; (b) reacting the polymer which is terminated with halogenated silicon moieties with a molar excess of a tertiary butyl alcohol to produce a polymer which is terminated with hydroxy silyl moieties; and (c) allowing the polymer which is terminated with the hydroxy silyl moieties to couple at a temperature which is within the range of 0° C. to 150° C. and under conditions sufficient to produce a dendrimer containing siloxane linkages.

2. The dendrimer of a rubbery polymer as specified in claim 1 wherein the lithium terminated rubbery polymer is a polybutadiene rubber.

3. The dendrimer of a rubbery polymer as specified in claim 1 wherein the lithium terminated rubbery polymer is a polyisoprene rubber.

4. The dendrimer of a rubbery polymer as specified in claim 1 wherein the lithium terminated rubbery polymer is a styrene-butadiene rubber.

5. The dendrimer of a rubbery polymer as specified in claim 1 wherein the lithium terminated rubbery polymer is a styrene-isoprene-butadiene rubber.

6. The dendrimer of a rubbery polymer as specified in claim 1 wherein the lithium terminated rubbery polymer is an isoprene-butadiene rubber.

7. The dendrimer of a rubbery polymer as specified in claim 1 wherein the lithium terminated rubbery polymer is a styrene-isoprene rubber.

8. The dendrimer of a rubbery polymer as specified in claim 1 wherein the polymer which is terminated with the hydroxy silyl moieties is coupled at a temperature which is within the range of 110° C. to 140° C.

9. The dendrimer of a rubbery polymer as specified in claim 1 wherein the tertiary butyl alcohol is present during the polymerization used in the synthesis of the lithium terminated polymer.

10. A tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is a cured rubber formulation which is comprised of (1) the dendrimer of the rubbery polymer specified in claims 1; and (2) a filler selected from the group consisting of carbon black and silica.

11. The tire as specified in claim 10 wherein the cured rubber formulation is further comprised of a coumarone-indene resin.

12. The tire as specified in claim 11 wherein the coumarone-indene resin is present in the cured rubber formulation at a level which is within the range of 5 phr to 60 phr.

13. The tire as specified in claim 11 wherein the coumarone-indene resin is present in the cured rubber formulation at a level which is within the range of 2 phr to 20 phr.

14. The tire as specified in claim 11 wherein the coumarone-indene resin is present in the cured rubber formulation at a level which is within the range of 1 phr to 5 phr.

15. The dendrimer of a rubbery polymer as specified in claim 1 wherein the polymer which is terminated with the hydroxy silyl moieties is coupled at a temperature which is within the range of 80° C. to 150° C.

* * * * *